United States Patent [19] [11] 3,874,986
Browall et al. [45] Apr. 1, 1975

[54] LAMINATED POROUS/NON-POROUS MEMBRANES

[75] Inventors: Warella R. Browall, Scotia; Robert M. Salemme, Schenectady, both of N.Y.

[73] Assignee: General Electric Company, Schenectady, N.Y.

[22] Filed: May 20, 1974

[21] Appl. No.: 471,320

[52] U.S. Cl.................. 161/160, 156/285, 161/183
[51] Int. Cl.......................... B32b 3/26, B32b 27/28
[58] Field of Search ............. 161/160, 183; 156/285

[56] References Cited
UNITED STATES PATENTS
3,740,305   6/1973   Hoback et al. ..................... 161/183

Primary Examiner—William J. Van Balen
Attorney, Agent, or Firm—Leo I. Malossi; Joseph T. Cohen; Jerome C. Squillaro

[57] ABSTRACT

A unified laminate of layers of polymer is disclosed, the laminate consisting of a layer of microporous substrate and an ultrathin layer of polyphenylene oxide (PPO) with an ultrathin layer of organopolysiloxane-polycarbonate copolymer disposed therebetween. The organopolysiloxane-polycarbonate copolymer layer serves to join the outer two layers together and provide cushioning to compensate for minor surface imperfections in the substrate.

3 Claims, No Drawings

LAMINATED POROUS/NON-POROUS MEMBRANES

BACKGROUND OF THE INVENTION

The preparation of ultrathin membranes from polyphenylene oxide (PPO) and organopolysiloxane-polycarbonate copolymer is described in U.S. Pat. application Ser. No. 356,514 - Ward, filed May 2, 1973 and assigned to the assignee of the instant application. Pertinent description is found in the Ward application in Examples 1, 2 and 3.

The preparation of microporous polycarbonate resin membranes is described in U.S. Pat. application Ser. No. 456,970 - Salemme, filed April 1, 1974 and assigned to the assignee of the instant invention. Both the Ward and Salemme patent applications are incorporated by reference.

In order to handle ultrathin membranes and put them to use, support therefor on microporous substrate material having desired strength and flexibility must be provided.

DESCRIPTION OF THE INVENTION

In the case of providing support for ultrathin PPO films it has been found advantageous to provide an intermediate layer between the PPO film and microporous backing materials such as Acropore AN–200 (manufactured by Gelman Instrument Company) and polycarbonate resin membranes prepared by the method set forth in the Salemme application. This intermediate layer functions both as an adhesive and as a cushion for the PPO layer to compensate for minor surface inperfections in the substrate.

The term "layer" as applied to PPO and organopolysiloxane-polycarbonate copolymer materials refers to a unified lamina consisting of one or more ultrathin films of the given material in which the films are strongly bonded together, but need not merge.

MANNER AND PROCESS OF MAKING AND USING THE INVENTION

The ultrathin non-porous membranes for use in the practice of this invention are prepared by the Ward process by casting on a confined liquid surface. A pair of movable longitudinally-extending barriers initially spaced apart a small distance and in contact with the liquid surface are employed, first, to accommodate the casting solution therebetween and second by relative separation thereof to controllably permit spreading of the casting solution over the surface of the film-support liquid. Water is the preferred film support liquid.

Polymers of particular importance in the practice of this invention are those which a) include repeating units comprising bisphenol-A polycarbonate units and dimethylsiloxane units and those which include repeating units in alternating blocks of bisphenol-A polycarbonate units and dimethylsiloxane units; and b) blends of poly-2,6-dimethylphenylene oxide (PPO) and organopolysiloxane-polycarbonate copolymer (as described above, such copolymer being described in U.S. Pat. No. 3,189,662 - Vaughn, Jr., incorporated by reference). Organopolysiloxane-polycarbonate copolymer in which alternating blocks of repeating bisphenol-A polycarbonate units and repeating dimethylsiloxane units are present can be prepared following the teachings of Vaughn above, the resulting materials being alternating, random, block polymers of the –ABABA– — type in which the blocks are polydisperse:

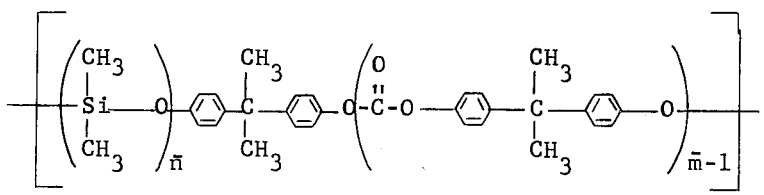

Polymer weight average molecular weight lies in the range of 15,000 to 50,000, $\bar{n}$ and $\bar{m}$ being selected to accommodate these values. Individual film thicknesses (after desolvation) will range from about 250A to about 500A.

The preferred solvent for the organopolysiloxane-polycarbonate copolymer is 1,2,3-trichloropropane (TCP). The preferred solvent system for the mixture of PPO and organopolysiloxane-polycarbonate copolymer is a mixture of equal volumes of 1,2,3-trichloropropane and 1,1,2,2,-tetrachloroethane (TCE).

Removal of the film from the surface of the filmforming solution as part of the laminate is most easily accomplished by vacuum-pickup as described in the Ward application. Apparatus for the film pickup in its simplest form consists of a closed chamber having one porous wall (e.g. sintered metal particles) at least the size of the area of film to be recovered. Initially a vacuum is drawn on the chamber after the porous wall has been covered with a layer of the microporous substrate and the substrate is brought into contact with the desolvated film. The solidified film is pulled against the surface of the microporous substrate. Subsequent films may be picked up in the same manner with each new film sticking to the earlier deposited one. Bubbles of gas entrapped between films are no problem as long as the vacuum is pulled, as the gas is gradually withdrawn from the bubbles by permeation and the film adjusts itself, shrinking as the gas leaves.

A typical casting solution for the organopolysiloxane-polycarbonate ultrathin films is 2–4% by weight of organopolysiloxane-polycarbonate [60% SiO (CH$_3$)$_2$; 20 SiO(CH$_3$)$_2$ units per block] copolymer in TCP. A typical casting solution for the PPO ultrathin films is 2–4% by weight of polymer (PPO + 20% by weight of the aforementioned organopolysiloxane-polycarbonate copolymer) dissolved in equal quantities of TCP and TCE.

Preparation of the composite PPO layer organopolysiloxane-polycarbonate copolymer layer nylon-reinforced, polyvinyl chlorideacrylonitrile copolymer layer (Acropore), for example, is accomplished by applying a layer of the microporous backing material over the porous wall of the pickup chamber while a vacuum is being drawn thereon and then bringing the substrate into contact with a desolvated ultrathin organopolysiloxane-polycarbonate copolymer film resting on the liquid casting surface. In this way, the solidified film of organopolysiloxane-polycarbonate copolymer is picked up and adheres to the backing material. Multiple organopolysiloxane-polycarbonate copolymer films may, if desired, be picked up in the same manner (vacuum being drawn in each instance) with each new film sticking to the earlier deposited one. The thickness of the organopolysiloxane-polycarbonate copolymer layer determines the extent of cushioning contributed by the layer.

When the appropriate thickness (one or more films) of organopolysiloxane-polycarbonate copolymer has been applied to the microporous substrate, the film pickup procedure is repeated, preferably adding two or more of the ultrathin PPO films to the aforementioned laminate to produce the overall composite structure desired. Initially, ultrathin PPO membranes were applied directly to the Acropore, but delamination occurred as is shown in Example 1.

EXAMPLE 1

Ultrathin PPO films were cast as required using a casting solution containing 4% by weight of PPO + 20% by weight of organopolysiloxane-polycarbonate [60% SiO $(CH_3)_2$; 20 SiO$(CH_3)_2$ units per block] copolymer dissolved in equal quantities of TCP and TCE. A sheet of Acropore was used as the backing and four ultrathin PPO films were applied in sequence to one face thereof using a vacuum chamber as described herein. Tests were conducted on the laminate to determine the $O_2/N_2$ separation factor thereof under high pressure (150–170 psig). The single unified PPO layer separated from the Acropore backing in patches. It was concluded that this delamination was due to poor bonding between the PPO and Acropore layers.

It was decided to attempt to improve this poor bonding condition and the construction of Example 1 was modified to introduce an intermediate ultrathin layer of organopolysiloxane-polycarbonate copolymer.

EXAMPLE 2

A sheet of Acropore was applied to a vacuum chamber pickup surface. First, an ultrathin film of 4% by weight organopolysiloxane-polycarbonate copolymer - a mixture of 5 parts [60% SiO$(CH_3)_2$; 40 SiO$(CH_3)_2$] units per block and 1 part [60% SiO$(CH_3)_2$; 20 SiO$(CH_3)_2$] units per block in TCP - was picked up over the Acropore backing. Then in sequence four ultrathin films of PPO (as in Example 1) were applied thereover. This laminate was successfully tested for $O_2/N_2$ separation at high pressure (90 psig), the pressure application being cycled. The enriched stream contained 44% by volume $O_2$ and no delamination occurred.

Since the organopolysiloxane-polycarbonate copolymer layer is 10 times more permeable (in equal thickness) than the PPO membrane, the $O_2$ enrichment by the unified laminate is not significantly changed as compared to the enrichment obtained with PPO in the absence of the organopolysiloxane-polycarbonate copolymer layer. In the composite, however, the organopolysiloxane-polycarbonate layer overcomes the delamination problem by adhering both to the PPO layer and to the Acropore backing.

This general construction of Example 2 was repeated using microporous Lexan (General Electric Company) polycarbonate (described in Example 3) and it was found that the layer of organopolysiloxane-polycarbonate provided the desired cushioning and resistance to delamination.

EXAMPLE 3

A sheet of microporous polycarbonate was applied to the suction surface of a vacuum-pickup chamber to serve as the backing layer. An ultrathin organopolysiloxane-polycarbonate copolymer film as used in Example 2 was first applied to the backing layer. Next two ultrathin PPO films (as in Example 1) were applied over the organopolysiloxane-polycarbonate layer. This composite was tested for $O_2/N_2$ separation under vacuum with a pressure difference of 1 atmosphere. The test was successful, the enriched stream having 48% by volume $O_2$ and no delamination occurring over an extended period of use.

The composites of this invention are intended for use as gas separation membranes. For such applications the composites will usually be subjected to significant pressure differentials. In use, therefore, the composite will be supported on a series of cloth and fine screens.

What we claim as new and desire to secure by Letters Patent of the United States is:

1. A composite containing unified layers of polymer consisting of a non-porous layer of polyphenyleneoxide/organopolysiloxane-polycarbonate copolymer, a backing layer of a material selected from the group consisting of microporous polyvinyl chloride-acrylonitrile copolymer and microporous polycarbonate and an intermediate layer of organopolysiloxane-polycarbonate copolymer adhering said non-porous layer to said backing layer.

2. The composite of claim 1 wherein the backing layer is microporous polycarbonate.

3. The composite of claim 1 wherein the backing layer is microporous polyvinyl chloride-acrylonitrile copolymer.

* * * * *